United States Patent [19]
Pedersen et al.

[11] 3,800,203
[45] Mar. 26, 1974

[54] WAVE GENERATION CIRCUIT

[75] Inventors: Niels P. Pedersen; John M. Shabel, both of Erie, Pa.

[73] Assignee: General Electric Company, Erie, Pa.

[22] Filed: Dec. 29, 1972

[21] Appl. No.: 319,686

[52] U.S. Cl............... 318/345, 318/631, 242/25 R, 328/127, 328/181, 307/228
[51] Int. Cl........................ H02p 5/16, H03k 4/08
[58] Field of Search... 242/25 R; 318/6, 7, 162–164, 318/631, 345; 307/228; 328/127, 128, 181, 185

[56] References Cited
UNITED STATES PATENTS
| | | | |
|---|---|---|---|
| 3,322,969 | 5/1967 | Callahan | 307/227 |
| 3,617,769 | 11/1971 | Hanson | 328/181 |
| 3,694,711 | 9/1972 | Bonikowski | 242/25 R |

OTHER PUBLICATIONS
George A. Philbrick Researches, Inc., Applications Manual . . . , 1966, p. 71.

Primary Examiner—Bernard A. Gilheany
Assistant Examiner—Thomas Langer
Attorney, Agent, or Firm—Arnold E. Renner; Harold H. Green, Jr.

[57] ABSTRACT

An electrical wave generation circuit for providing a modified saw-tooth wave which includes a means for effecting a substantially instantaneous change in the saw-tooth configuration upon the selective application of relatively positive and negative d.c. sources thereto in an alternating fashion. The circuit includes an integrating circuit having impedance means which serves to effect the instantaneous change in output signal.

6 Claims, 5 Drawing Figures

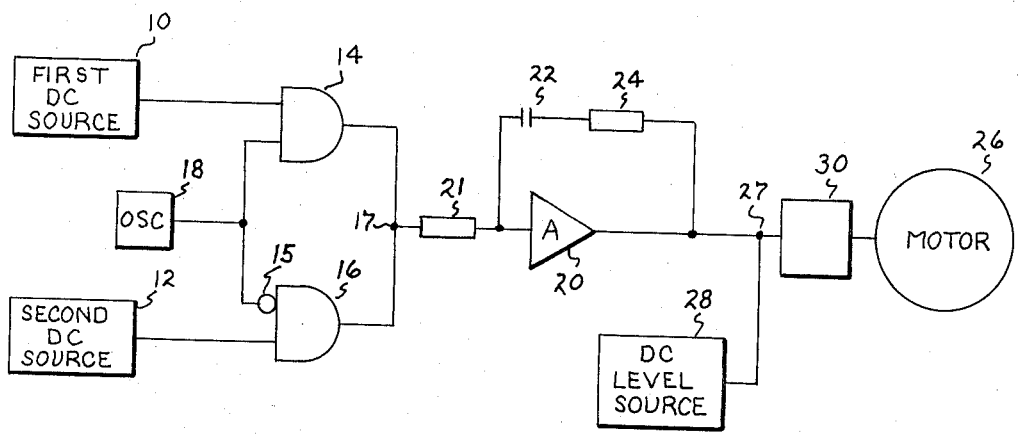
FIG.3
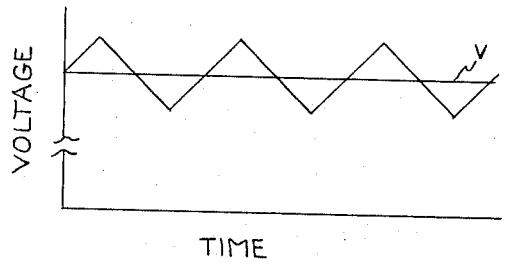
FIG.1ᵃ
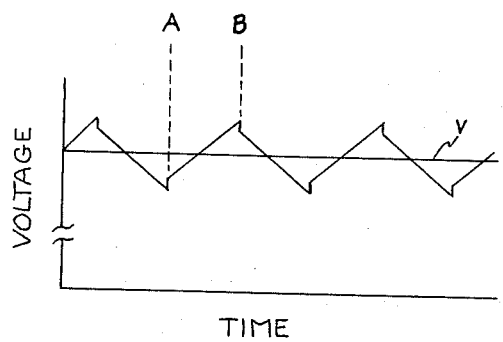
FIG.2ᵃ
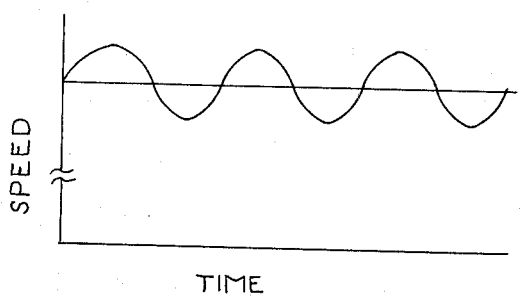
FIG.1ᵇ
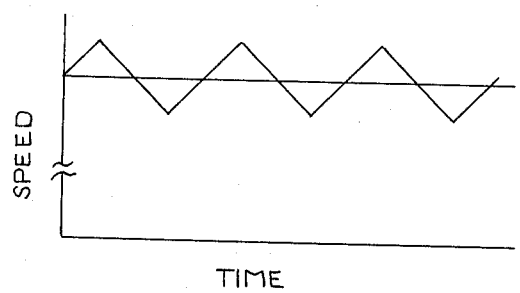
FIG.2ᵇ

WAVE GENERATION CIRCUIT

BACKGROUND OF THE INVENTION

The present invention relates generally to a circuit for generating a modified saw-tooth wave shape and more particularly to a circuit for generating a modified saw-tooth having a substantially instantaneous variation at each of the apices of the wave shape. The present invention has particular application for use with respect to the control of motors in which the speed is a function of the characteristics of the applied power.

The normal d.c. traction motor, for example, exhibits a speed characteristic which is a function of the input voltage to the motor. Certain a.c. motors exhibit a speed characteristic which is a function of the input voltage and/or frequency. In certain instances it is desired that a motor should have a prescribed average speed but that the instantaneous speed is continously varied throughout relatively minor limits in order to provide what may be termed a "jerky" motion to the motor speed. An example of such an application is in the processing or manufacturing of synthetic fibers with respect to the spooling motor which drives the spool upon which the fiber or strand is wound as it is produced. It has been found that the running of the motor at a constant speed results in an application of the fiber to the spool in a manner such that the threads tend to pile directly one upon the other and not firmly pack upon the spool. In this application, it is known to apply a saw-tooth wave superimposed upon a d.c. reference level as the motor voltage or control voltage to essentially provide a continuous variation in the motor speed such as to more firmly pack the fibers upon the spooling operation. However, because of inertial effects of the motor, the final transmission of power to the spool has not resulted in sufficiently violent variations in the spool (motor) speed to provide the firm packing as is fully desired.

SUMMARY OF THE INVENTION

The present invention alleviates this problem of the prior art by providing a wave generation circuit which develops a modified saw-tooth wave having a substantially instantaneous variation at each of the apices of the wave. This wave, when used to control a motor, either directly or through a conversion unit such as an inverter in the case of an a.c. motor serves to vary the motor speed in a "jerky" manner.

It is, therefore, an object of the present invention to provide a modified saw-tooth generating circuit which provides a substantially instantaneous variation at each apex of the saw-tooth output.

It is a further object of the present invention to provide a motor control circuit which results in a sharp change in motor speed in response to the input voltage.

DESCRIPTION OF THE DRAWINGS

The foregoing and other objects will become apparent as the following description proceeds and the features of novelty which characterize the invention will be pointed out in particularity in the claims annexed and forming a part of this specification. For a better understanding of the invention, reference is made to the accompanying drawings in which:

FIGS. 1a and 1b are graphs depicting the problems of prior art systems in which the FIG. 1a represents control voltage, with respect to time, and the FIG. 1b illustrates motor speed with respect to time;

FIGS. 2a and 2b are graphical representations, similar to those of FIGS. 1a and 1b, showing with respect to time, in FIG. 2a the control voltage and in FIG. 2b the resultant motor speed in accordance with the circuit of the present invention; and, FIG. 3 is a schematic line drawing of the wave generation circuit of the present invention.

DETAILED DESCRIPTION

Referring first to FIGS. 1a and 1b, there is shown and best illustrated the problem prevalent with the prior art systems. In FIG. 1a there is plotted, against time as the abscissa, the control voltage of the motor as the ordinate. It is seen in that figure that superimposed upon a d.c. voltage level designated V there is provided a variation in the form of a symmetrical saw-tooth wave. The application of this type of control to a motor results in the speed versus time characteristic as shown in FIG. 1b. In that figure it is seen that, rather than the sharp change in speed as might ordinarily be expected from the type of applied control, the motor speed output tends to approximate a sine wave rather than a triangular wave. This type of speed output results primarily from inertial effects of the motor and its associated load.

The graphs of FIGS. 2a and 2b illustrate, respectively, the voltage output of the circuit of the present invention and its effect upon the speed of the motor. In FIG. 2a it is seen that there is once again provided a voltage level designated as V. Superimposed upon this voltage level is a substantially saw-tooth wave which includes a substantially instantaneous change at each of the apices of the saw-tooth. The relative values of the voltage V and the peaks, both positive and negative, of the wave are of course varied in accordance with the requirements of the individual load; but in each case it is seen that the voltage changes to a peak value at which time there is then an instantaneous change in the opposite direction from which point the voltage then will proceed in the opposite direction to once again peak where an instantaneous change in direction again occurs. As shown in FIG. 2b which plots speed versus time, the resultant speed of a motor having a control voltage such as shown in FIG. 1a will vary more sharply and will more closely approximate a saw-tooth configuration; that is, the motor speed tends to change more sharply resulting in an output motor torque having a substantially instantaneous change in direction.

The means by which the desired voltage wave shape at FIG. 2a is generated is illustrated in FIG. 3. Referring now to that Figure, it is seen that there is provided a source of relatively opposite d.c. potential polarities illustrated as a first d.c. source 10 and a second d.c. source 12. For terms of convenience, the first d.c. source 10 may be considered of a source of relative positive polarity and the second d.c. source 12 may be considered as a source of relatively negative polarity. The output of the first d.c. source 10 is applied as an input to one input of an AND gate 14, which in conjunction with a second AND gate 16 and an oscillator 18 comprise a switching network. The second d.c. source 12 has its output applied as one input to the AND gate 16. The oscillator 18 may be of any suitable type having an output which varies, with respect to an arbitrary zero, alternately between a relatively positive state and a relatively negative state. The output of the oscillator 18 is applied as a second input to each of the AND gates 14 and 16, with the output to the AND gate 14 being a direct connection while the input to the AND gate 16 is illustrated through an inversion function illustrated by the circle input 15. Thus, at the output of each of the AND gates 14 and 16, junction 17, there is applied a d.c. signal alternately from the AND gates 14 and 16 such that the signal appearing at junction 17 is essentially a square wave of relatively positive and negative values.

The signal at junction 17 is applied through an input resistor 21 as an input to an amplifier 20 which may be of any suitable type. Connected in a feedback path between the output of the amplifier and its input is a series arrangement of a capacitor 22 and a resistor 24. The amplifier 20 and the capacitor 22 form the common amplifier integrator such as is well known in the art. The resistor 24 represents an impedance element in accordance with the present invention which effects the substantially instantaneous change in the output voltage of the integrator to provide the wave shape shown in FIG. 2a. The output of the amplifier 20 is connected to a summing junction 27 to which is also applied, in the preferred embodiment as illustrated, a d.c. level source 28. The signal at junction 27 forms an input to a conversion unit 30 the output of which is the power input to a motor 26. If the motor 26 is an a.c. motor, conversion unit 30 would typically be an inverter whose output voltage and/or frequency is a function of the input signal at junction 27. If motor 26 is a d.c. motor, the conversion unit would serve to raise the power level of the signal at junction 27 to a suitable level if such were necessary. If the power level at junction 27 is sufficiently high for the motor used, conversion unit 30 would not be required.

By way of explanation of the operation of the present invention, it will first be assumed that the oscillator is providing a relatively positive output which enables gate 14 and disables gate 16. Thus, there is supplied at junction 17 a d.c. signal which may be, for example, a positive 10 volts. This signal is applied to the integrating circuit including the amplifier and the feedback path and, as shown in FIG. 2a the output voltage from the integrating circuit begins to rise in accordance with the integration function. During this time the capacitor 22 receives its charge from a current through resistor 24. This current is equal to the input current to the amplifier. The same current generates a voltage drop across resistor 24. The amplifier output is the sum of the voltage across capacitor 22 and resistor 24. At point A in FIG. 2a the oscillator disables gate 14 and enables gate 16 thereby changing the polarity of the input current to the amplifier 20. This causes the charging current to change polarity, thereby changing the polarity across resistor 24. Since the capacitor voltage cannot change instantaneously, the output voltage will change as shown in FIG. 2a. After this initial voltage drop the capacitor will commence charging in the direction opposite to that in which it was originally charged as shown between the ascending line in FIG. 2a between point A and point B. With the next change in the oscillator, the voltage appearing at junction 17 will reverse from a relatively negative to a relatively positive value and the instantaneous variation in integrator output due to the resistor in the feedback path will occur. Thus, the output of the integrating circuit as it appears at function 27 will be a modified saw-tooth wave having a substantially instantaneous change in accordance amplitude with each change in application of input voltage inaccordance with the present invention. As was previously described, this substantially instantaneous change will result in a very rapid change in motor speed to more closely approximate the saw-tooth speed variation as shown in FIG. 2b.

While there has been shown and described what is at present considered to be the preferred embodiment of the present invention, modifications thereto will readily occur to those skilled in the art. The appended claims, therefore, are intended to cover all such modifications as fall within the true spirit and scope of the present invention.

What is claimed is:

1. A motor control system for effecting periodic variations in applied motor signal to effect a periodic change in motor speed, said system comprising:
   a. a source of direct current potential having two outputs of relatively opposite polarity;
   b. switching means for selectively utilizing the outputs from said source to provide an input signal of changing relative polarity;
   c. an integrating circuit responsive to said input signal, said integrating circuit including means effective upon a change in relative polarity of said input signal to modify the normal output of said integrating circuit by effecting a substantially instantaneous change therein; and,
   d. motor means connected to the output of said integrating circuit for receiving the output therefrom.

2. The invention in accordance with claim 1 wherein said integrating circuit includes an amplifier having a feedback path including a capacitor and an additional impedance means.

3. The invention in accordance with claim 2 wherein the impedance means is a resistor.

4. The invention in accordance with claim 3 wherein said resistor is in series with said capacitor.

5. A motor control system for effecting periodic variations in applied input power to said motor to effect a periodic change in motor speed, said system comprising:
   a. a first source of direct current potential having a first relative polarity;
   b. a second source of direct current potential having a second opposite polarity with respect to said first source;
   c. switching means including an oscillator operable at a prescribed frequency and a pair of gating means responsive to relatively opposite going signals from said oscillator whereby power is selectively delivered from said first and said second sources of d.c. potential through said gating means;
   d. an integrating circuit connected to receive the output of said switching means, said integrating circuit including means, effective upon a relative change in polarity of the output of said switching means to provide a substantially instantaneous change in the output of said integrating circuit, comprising an amplifier having a feedback connected between its output and its input said feedback path including the series arrangement of a capacitor and a resistor; and, e. motor means connected to the output of said integrating means for receiving the signal therefrom.

6. The invention in accordance with claim 5 further including additional source of d.c. potential connected to the output of said amplifier whereby there is provided an output signal to effect the control of the speed of said motor.

* * * * *

UNITED STATES PATENT AND TRADEMARK OFFICE
CERTIFICATE OF CORRECTION

PATENT NO. : 3,800,203
DATED : March 26, 1974
INVENTOR(S) : Niels P. Pedersen and John M. Shabel It is certified that error appears in the above—identified patent and that said Letters Patent are hereby corrected as shown below:

Title should read --WAVE GENERATION CIRCUIT IN A MOTOR CONTROL--

Column 4, line 3, cancel "function" and substitute --junction--.
         line 4, cancel "ac-".
         line 5, cancel "cordance".
         line 6, cancel "inaccordance" and substitute
             --in accordance--.

Signed and Sealed this ninth Day of December 1975

[SEAL]

Attest:

RUTH C. MASON
*Attesting Officer*

C. MARSHALL DANN
*Commissioner of Patents and Trademarks*